United States Patent [19]
Boutevin et al.

[11] Patent Number: 5,436,309
[45] Date of Patent: Jul. 25, 1995

[54] PHOTO-CROSSLINKABLE SILICONES COMPRISING OXYALKYLENE STYRENE GROUPS AND THEIR USE

[75] Inventors: Bernard J. L. Boutevin; Latifa Abdellah, both of Montpellier, France; Gerardo Caporiccio, Milan, Italy

[73] Assignee: Dow Corning Corporation, Midland, Mich.

[21] Appl. No.: 229,247

[22] Filed: Apr. 19, 1994

[30] Foreign Application Priority Data

Apr. 19, 1993 [FR] France .................. 93 04564

[51] Int. Cl.$^6$ .................. C08G 77/20; C08G 77/24; C08G 77/28; C08F 2/50
[52] U.S. Cl. .................. 528/25; 528/29; 528/34; 528/36; 528/32; 528/42; 522/31; 522/99; 428/447; 427/515
[58] Field of Search .................. 528/30, 43, 36, 32, 528/25, 29, 34, 42; 522/31, 99; 427/515; 428/245, 391, 447

[56] References Cited

U.S. PATENT DOCUMENTS

| | | | |
|---|---|---|---|
| 3,873,499 | 3/1975 | Michael et al. | 260/46.5 |
| 4,064,027 | 12/1977 | Gant | 204/159.13 |
| 4,387,206 | 6/1983 | Bayer et al. | 528/28 |
| 4,543,397 | 9/1985 | Woods et al. | 522/99 |
| 4,617,238 | 10/1986 | Crivello et al. | 428/452 |
| 4,640,849 | 2/1987 | Woods et al. | 522/99 |
| 4,822,850 | 4/1989 | Yashuda et al. | 528/28 |
| 4,849,461 | 7/1989 | Lee et al. | 522/33 |
| 4,909,935 | 3/1990 | Bradshaw et al. | 210/198.2 |
| 5,057,549 | 10/1991 | Herzig et al. | 522/99 |
| 5,166,295 | 11/1992 | Herzig | 528/15 |
| 5,208,312 | 5/1993 | Boutevin et al. | 528/28 |

FOREIGN PATENT DOCUMENTS

| | | |
|---|---|---|
| 2035396 | 1/1991 | Canada . |
| 2041262 | 4/1991 | Canada . |
| 1569681 | 10/1977 | United Kingdom . |

*Primary Examiner*—Susan W. Berman
*Attorney, Agent, or Firm*—Timothy J. Troy

[57] ABSTRACT

The invention is concerned with silicone copolymer containing terminal and/or pendant oxyalkylene styrene groups which are crosslinkable in the presence of a photoinitiator when exposed to UV radiation and their use in a compositions for coating substrates to provide substrates with anti-adhesive properties.

10 Claims, No Drawings

PHOTO-CROSSLINKABLE SILICONES COMPRISING OXYALKYLENE STYRENE GROUPS AND THEIR USE

This invention relates to silicone co-polymers containing siloxane units which can be crosslinked using a photosensitive, cationic catalyst and the use of the silicone co-polymers in anti-adhesive coating compositions.

It is known to employ compositions comprising silicone co-polymers as coatings to a variety of substrates in order to provide the substrate with, for example anti-adhesive or insulating properties. However, there is a continual need to provide improved silicone co-polymers which may be applied to a substrate and cured rapidly thereon by UV radiation to provide thin anti-adhesive coatings.

We have now found that silicone copolymers having pendant and/or terminal oxyalkylene styrene groups attached to a silicon atom of a siloxane unit through a bridging group comprising an alkylene group which may contain oxygen or sulphur atoms, can be applied to a substrate as a film and rapidly cured thereon to provide a coating having good resistance to heat and anti-adhesive properties which does not adhere to even very strong adhesive materials.

According to the invention there is provided a silicone copolymer having a molecular weight of 5,000 to 100,000 having the general formula (I):

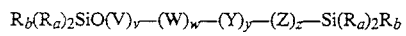

wherein V is a diorganosiloxane unit having monovalent hydrocarbon substituents having 1 to 8 carbon atoms; $R_a$ is a group selected from methyl, ethyl, n-propyl, n-butyl, pentyl, hexyl, octyl and phenyl provided no more than one phenyl radical is bonded to any silicon atom; $R_b$ is a group $R_a$ or an oxyalkylene styrene group connected to a silicon atom of a siloxane unit through an alkylene chain which may have oxygen or sulphur atoms present in the chain; W is a siloxane unit having an oxyalkylene styrene group connected to the silicon atom of the siloxane unit through an alkylene chain which may contain oxygen or sulphur atoms in the chain; Y is a diorganosiloxy unit wherein the organo radicals are hydrocarbons having 1 to 12 carbon atoms or a fluorinated hydrocarbon group having 1 to 12 carbon atoms and Z represents a silfluoroalkylenesiloxy unit; v, y and z have identical or different values but they are not simultaneously zero; w is always non-zero and v+y+z/w is from 1 to 100.

The V units in a silicone co-polymer according to the invention are preferably according to the general formula, $-Si(R_a)_2O-$ wherein $R_a$ is as defined above.

The V siloxane units can be formed by methods well known in the art, for example from chlorosilanes.

The W units in a silicone copolymer according to the invention are preferably according to the general formula, $SiR'_a(R_c-R_d-PhCH=CH_2)$ O— wherein $R'_a$ represents a group $R_a$ or alkoxy, preferably having 1 to 4 carbon atoms for example methoxy or ethoxy; $R_c$ is an alkylene chain which may contain oxygen or sulphur atoms and is preferably selected from the group $C_2H_4$, $C_3H_6$, $C_2H_4SC_2H_4$, $C_3H_6SC_2H_4$, $C_3H_6OC_2H_4$ or $C_2H_4OC_2H_4$; $R_d$ is an oxyalkylene unit, preferably $O(CH_2)_p$ where p can be 1 or 2 and Ph represents a para- or meta-substituted phenylene group.

W units of a silicone copolymer according to the invention may be formed, for example by hydrolysis of the acetoxy group of 3-acetoxypropyl-methyl dichlorosilane and condensation of the free hydroxyl group with 3-(chloromethyl) styrene, as illustrated in the reaction scheme below. It should be noted that in the following reaction scheme, Ph represents a para- or meta-phenylene group.

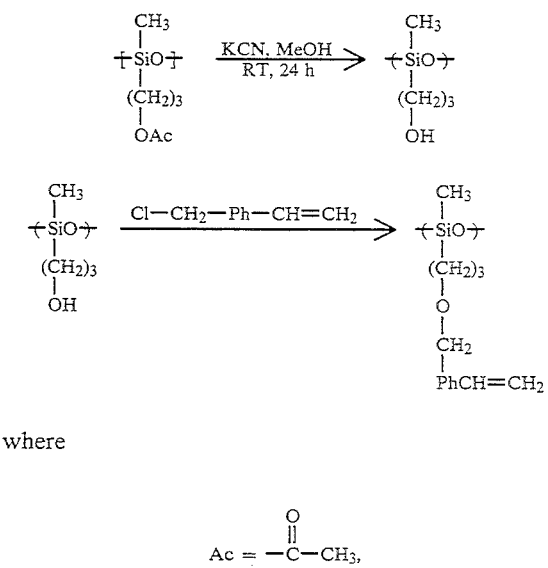

where $$Ac = -\overset{\overset{O}{\|}}{C}-CH_3,$$

Ph=para or meta phenylene.

The reaction may be carried out in the presence of pyridine within the temperature range of 40° to 80° C. in an inert solvent such as $CCl_4$. Alternatively, units W may be made according to a procedure in which a siloxane unit having a vinyl group and co-polymerised along the siloxane chain is reacted with 2-thioethanol in the presence of a radical initiator, for example azoisobutyronitrile (AIBN) at a temperature of between 60°–80° C. (see below).

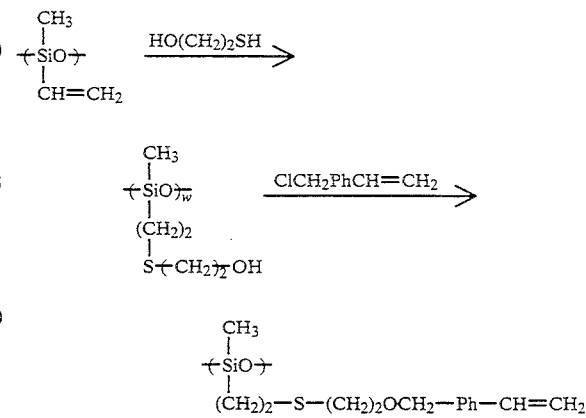

Alternatively, other photocrosslinkable groups may be incorporated along the polysiloxane chain, for example:

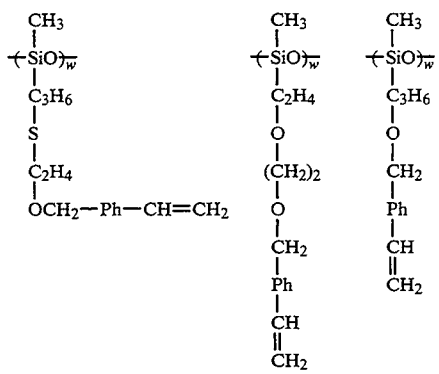

Similar structures may represent one or both of the terminal groups of the chain, for example C$_3$H$_6$OCH$_2$—C$_6$H$_4$—CH=CH$_2$. These are indicated as units R$_b$ in the general formula (I)

The siloxane units containing oxalkylene styrene groups are active units capable of causing crosslinking of the copolymers (I) by irradiation by a UV source in the presence of a photosensitive cationic catalyst.

The —R$_c$R$_d$—bridge which connects the peripheral active styrene group to the siloxane chain of a copolymer according to the invention is an important aspect of this invention: due to the length of this group and its mobility about the central Si atom and the —Si—O—axis, in particular when more than one oxygen or sulphur is inserted into the bridge the non-crosslinked silicone copolymers display a fluid state even for very high molecular weights at ambient temperature and pressure which makes it easy to obtain a thin coating layer without using solvent; additionally, they cure rapidly in the presence of a photoinitiator.

A unit Y of a silicone co-polymer according to the invention is preferably represented by the general formula —SiR$_a$R$_e$O—wherein R$_a$ is as hereinbefore defined and R$_e$ is a group according to the formula C$_k$H$_{2k}$R$_f$, or C$_k$H$_{2k}$R$_a$ where k is 2, 3 or 4 and R$_f$ is a fluorinated alkyl group with 1 to 12 carbon atoms, preferably selected from —CF$_3$, —C$_2$F$_5$, —C$_3$F$_7$, —C$_4$F$_9$, —C$_6$F$_{13}$ or —C$_8$F$_{17}$ or a higher perfluoroalkyl group formed from the telomerization of tetrafluoroethylene (TFE) or a monovalent radical of an oligomer of fluorinated oxetanes or oxiranes.

Preferred fluoroalkyl substituents of the group R$_e$ are perfluoro alkyl dimethylene, perfluoroalkyl trimethylene or perfluoroalkyl tetramethylene or phenyl substituted by a perfluoroalkyl group and the perfluoro fragment of the said radicals substituted by a perfluoroalkyl group contain 1 to 4 carbon atoms; preferred oligomers of fluorinated oxiranes or oxetanes of R$_e$ are, R"$_f$O(C$_3$F$_6$O)$_m$CF(CF$_3$)CA$_2$OC$_3$H$_6$—C$_3$F$_y$O(C$_3$H$_2$F$_4$O)$_m$CH$_2$CF$_2$CA$_2$OC$_3$H$_6$—and R"$_f$O(CF$_3$C$_2$H$_3$O)$_m$C$_3$H$_6$ wherein A represents hydrogen or fluorine and R"$_f$ is —CF$_3$, —C$_2$F$_5$ or —C$_3$F$_7$ and m is from 1 to 20, preferably 1 to 10; Y units as hereinabove described may be formed from reactive intermediate compounds, X$_2$R$_a$R$_e$Si (II), wherein X represents a reactive group selected from halogen e.g. chlorine, hydroxyl, alkoxy, acetoxy, amino, alkyl amino and dialkyl amino groups.

A unit Z of a silicone co-polymer according to the invention is preferably of the general formula —R$_a$R$_e$SiC$_n$H$_{2n}$R'$_f$C$_n$H$_{2n}$SiR$_a$R$_e$O—wherein R$_a$ and R$_e$ are as hereinabove defined, R'$_f$ is a perfluoroalkylene group with 2 to 10 carbon atoms such as —C$_2$F$_4$—, C$_4$F$_8$, —C$_6$F$_{12}$—or —C$_8$F$_{16}$—, or an α,omega-fluoroalkenyl group formed by telomerization of tetrafluoroethylene or a divalent telechelic radical of an oligomer derived from fluorinated oxetanes or oxiranes or a m-phenylene di-(hexafluoroisopropoxy) radical and n is 2, 3 or 4.

Units Z according to the invention may be formed from intermediate compounds according to the formula $$XR_aR_eSi(R^3SiR_aR_e)_qX \qquad (III)$$

wherein X, Ra and Re are as hereinabove defined and R$^3$ represents a divalent radical according to the formula, —C$_k$H$_{2k}$—R'$_f$—C$_k$H$_{2k}$—where R'$_f$ contains a —(C$_2$F$_4$)$_r$— radical, wherein r is from 2–20, preferably 2–10, which is obtained by telomerization of tetrafluoroethylene or a divalent radical derived from oligomers of fluorinated oxetanes or fluorinated oxiranes or alternatively it is a metaphenylene di(hexafluoroisopropoxy) radical, —[(CH$_2$)$_3$OC(CF$_3$)$_2$]$_2$ Ph where Ph is a meta-phenylene group and q is 1 to 3.

Preferably, R$^3$ is a group selected from —C$_k$H$_{2k}$—(C$_2$F$_4$)$_n$—C$_k$H$_{2k}$—, —C$_3$H$_6$O(CF$_3$)$_2$C—C$_6$H$_4$C(CF$_3$)$_2$OC$_3$H$_6$—, —C$_3$H$_6$OCA$_2$CF$_2$CH$_2$O(C$_3$H$_2$F$_4$O)$_g$T'O(C$_3$H$_2$F$_4$O)$_g$, —CH$_2$CF$_2$CA$_2$OC$_3$H$_6$, —C$_3$H$_6$OCH$_2$CF$_2$O(C$_2$F$_4$O)$_h$(CF$_2$O)$_i$CF$_2$CH$_2$O(C$_3$H$_6$, —C$_3$H$_6$OCA$_2$CF(CF$_3$)O(C$_3$F$_6$O)$_g$T'O(C$_3$F$_6$O)$_g$—and —CF(CF$_3$)CA$_2$OC$_3$H$_6$—wherein the recurring units may be arranged randomly or in succession along the chains; T' is a group selected from —C$_2$F$_4$, —C$_4$F$_8$—, —C$_5$F$_{10}$—and —(C$_2$F$_4$)$_2$O—; k is 2, 3 or 4; r and m are as hereinabove defined; g is from 1 to 20 and is preferably 2 to 10; h/i is from 0.5 to 20, h+i is from 8 to 100 and is preferably 8 to 20.

Silicone co-polymers (I) may be obtained by the hydrolysis or co-hydrolysis or the condensation polymerisation of silane intermediates of the type X$_2$Si(R$_a$)$_2$, X$_2$SiR'$_a$(R$_c$—R$_d$—PhCH=CH$_2$), X$_2$SiR$_a$R$_e$, X[R$_a$R$_e$SiC$_k$H$_{2k}$R'$_f$C$_k$H$_{2k}$SiR$_a$R$_e$]X and XSi(R$_a$)$_3$ wherein x=halogen, e.g. chlorine, representing illustrative precursors of the groups (V), (W), (Y) and (Z) hereinabove defined. The silane intermediates may be conveniently reacted in order to provide a silicone co-polymer having a chain structure wherein the units (V), (W), (Y) and (Z) are arranged randomly, sequentially or alternated along the polymer chain.

Preferred units Y and Z are characterised by the groups Rf and R'f which are fluoroalkyl and fluoroalkylene groups respectively and which may be formed by the telomerisation of TFE. A preferred process for the formation of telomers of TFE consists of radical telomerisation of TFE.

The telomerisation of TFE may be initiated by telogens substituted by bromine or iodine represented by the formulae R$_f$X' or X'R'$_f$X' where R$_f$ and R'$_f$ are as hereinabove defined and X' is bromine or iodine; illustrative of these telogens are CF$_3$I, C$_2$F$_5$I, n- or iso-C$_3$F$_7$I, n-C$_4$F$_9$I, C$_2$F$_5$Br, CF$_3$CFBrCF$_2$Br, CF$_2$Br, CF$_2$ICF$_2$I, I(C$_2$F$_4$)$_r$I (r=2 to 10).

The telogens containing two reactive iodine or bromine atoms (X'), give α,w-telechelating telomers which may be attached to two different silicon atoms by means of linear, nonhalogenated alkylene radicals with 2, 3 or 4 carbon atoms. To obtain the linear structure and the absence of considerable crosslinking which characterise the present organosilicon compounds, the synthesis should be conducted appropriately with regard to the subsequent series of reactions of the appropriate silanes with tele-chelating dihalotelomers and with monoiodoand or monobromo- telomers or with the other compounds described herein.

The telomerization process of TFE initiated by the said telogens according to the present invention may be activated by heat or by gamma radiation or ultraviolet radiation, initiators of the organic peroxide type or redox systems. Preferred catalysts for the reactions include benzoyl peroxide, di-t-butyl peroxide, t-butyl-peroxy-pivalate and percarbonates.

The reaction may be carried out in the presence of organic solvents which include, for example 1,1,2-trichlorotrifluoroethane, t-butyl alcohol, acetonitrile and mixtures thereof. Catalysts such as redox systems with persulfate may also be included and the telomerization may be carried out in an aqueous dispersion.

The telomerization temperature is between ambient temperature and 150° C. if the process is activated by irradiation or by catalysts or between 150° C. and 400° C. if the process is activated thermally.

The pressure under which the reaction is carried out may range from atmospheric pressure to about 100 atmospheres and care must be taken to exclude oxygen from the telomerization reaction.

The fluorinated telomers are then attached to the silicon atoms of the siloxane units of the present compounds by means of an alkylene radical free of halogen substituents having 2, 3 or 4 carbon atoms, for example dimethylene, trimethylene or tetramethylene radicals according to a termination procedure which is carried out appropriately. Ethylene is a reactant which may be used easily in the chain termination reaction.

When correctly attached to the siloxane units as described above the telomers impart to the silicone copolymers a high degree of thermal resistance and anti-adhesive properties.

Fluorinated oligomers of oxetanes and oxiranes of the present invention may be prepared using well known methods for the oligomerisation of fluorinated oxalkylene compounds such as perfluoropropene oxide, 2,2,3,3-tetrafluorooxetane and 3,3,3-trifluoropropene oxide. Some of these oligomers are commercially available.

According to a preferred procedure the preferred polyoxyalkylene oligomers are prepared by reacting cesium fluoride or potassium fluoride with perfluorinated carbonyl compounds such as hexafluoroacetone, trifluoroacetyl fluoride, perfluoropropionyl fluoride, carbonyl fluoride, perfluorosuccinyl fluorides or 1,5-oxaperfluoroglutaryl fluorides which are capable of initiating the oligomerization of perfluoro-oxiranes and fluoro-oxetanes according to the known process.

The resulting perfluorinated polyoxalkylene-carbonyl fluoride must be reacted in order to form the appropriate intermediate compounds which can be attached to silicon atoms of the siloxane units. A preferred procedure comprises the stoichiometric addition of potassium fluoride and subsequent substitution with allyl bromide in order to obtain fluorinated polyoxalkylene oligomers end capped by allyl groups which are then made to react with a reactive organohydrogenosilane.

Alternatively fluorinated oligomers of polyoxyalkylenes may be connected to silicon atoms of the siloxane units by the metathesis of the terminal acid carbonyl fluoride groups of these oligomers into methyl esters and subsequent reduction into methanol radicals followed by a terminal capping with allyl bromide according to the well known Williamson ether synthesis.

Fluorinated telomers terminated by one or two ($X'C_kH_{2k}$)—groups where $X'$ is a bromine or iodine atom may be converted into an organometallic derivative such as a Grignard reagent, an organo-cuprate reagent or an organic compound of lithium, zinc or aluminium, and they may then be made to react with a silane containing at least one halogen such as fluorine, chlorine or bromine or at least one alcoholate group. The organometallic compound may be formed beforehand or it may be formed in the presence of the silane.

In an alternative process, the alpha-iodo or $\alpha$-bromo terminal group of the fluoroalkane telomer terminated by a polymethylene group or the analog telechelic $\alpha$,omega-diiodo- or dibromo- or -bromoiodo-polymethylene polyfluoroalkane may be dehydrogenated to give, respectively, one or two terminal vinyl groups which may be made to react by means of a hydrosilylation reaction with the silanes containing at least one hydrogen atom bonded to silicon. The reaction is catalyzed by organic peroxides or platinum catalysts.

In the case of silanes of formula II, in addition to the two atoms or groups necessary for reaction with the above-mentioned fluorinated telomers and oligomers or other groups, the silanes, after reaction with the monofunctional telomers and oligomers or with other groups, contain two reactive X entities as in formula II which may then be made to react with other silanes in order to form the polysiloxane sequence. These two reactive entities include for example, halogens such as chlorine, alkoxy groups containing one to four or more than four carbon atoms, the hydroxyl group and primary or secondary amino groups.

In the case of formula III the silanes which react with the difunctional derivatives of telomers or oligomers or other groups, and with monofunctional derivatives of telomers or oligomers or other groups, require one of the above-mentioned reactive entities (X) on each of the two telechelic silicon atoms present on the end of the molecule represented by formula III. These reactive entities (X) may then react with other silanes in order to form a polysiloxane copolymer with an elongated chain structure according to formula I, above.

The V, W, Y and Z units may be appropriately homopolycondensed separately in order to form a homogeneous or copolycondensed sequence with statistical sequences according to techniques known in the art.

The crosslinking of the silicone copolymers of formula I containing a peripheral, lateral oxalkylene styrene group is brought about by activation with UV light in the presence of a cationic photoinitiator. A typical example of the silicone copolymer according to the invention given by way of illustration but not limiting the invention, is represented by formula (CH$_3$)$_3$Si[OSi(CH$_3$)$_2$]$_v$[OSi(CH$_3$)]$_w$—OSi(CH$_3$)$_3$
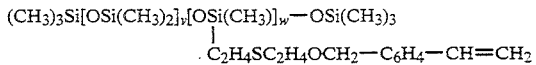

In another aspect of the invention there is provided a composition comprising a silicone copolymer as hereinbove described and a photoinitiator.

The photoinitiator may be selected from halogenonium, sulfonium, iodonium or phosphonium salts with the preferred photoinitiators being of the triaryl sulfonium hexafluoroantimonate type. The photoinitiator may be provided in proportions suitable to bring about the crosslinking of the silicone copolymer. Preferably, the photoinitiator is employed in proportions of from 1 to 10 parts per 100 parts and most preferably 1 to 6 parts per 100 parts of silicone copolymer (I).

The composition according to the invention may consist of the silicone copolymer I and a photoinitiator, however, preferred compositions according to the invention additionally employ a solvent. The solvent employed may be any suitable inert solvent such as tetrachloroethylene or toluene, however we prefer to employ acetone as solvent. The solvent may be present in proportions of from 2 to 10 parts by weight and is preferably provided in proportions of from 2 to 5 parts by weight per 100 parts of the silicone co-polymer (I).

A composition according to the invention may be prepared by any convenient method, for example the silicone copolymer and the photoinitiator and/or their solutions in a suitable solvent may be mixed together, preferably the silicone co-polymer and the photoinitiator are added independently and simultaneously to a solvent and dissolved therein.

In yet another aspect of the present invention there is provided a method of forming an anti-adhesive coating on a suitable substrate comprising the steps of applying a composition hereinabove described to a substrate surface and allowing the composition to cure upon exposure to UV radiation.

The coating composition according to the invention may be applied to a suitable substrate, for example metals e.g. aluminium, and fibrous materials e.g. textiles, cardboard and paper as a thin waxy coating or from a solution. Coating compositions may be applied to a substrate by techniques known in the art, for example direct or offset gravure, air knife, bar coating or blade coating.

Coating compositions according to the invention may be cured on a substrate surface by irradiation by an ultraviolet source.

There now follows a series of examples illustrating aspects of the synthesis of the siloxane copolymers and an example illustrating the coating composition aspects of the invention. All parts are expressed as percentages by weight unless otherwise specified and the symbols Ac and φ represent the acyl group

and phenyl group respectively

EXAMPLE 1

Preparation of a Polysiloxane Containing pendant Oxamethylene Styrene Groups.

The synthesis was carried out in three stages,

Stage 1—Preparation of a Polydimethyl Siloxane Containing Primary Hydroxyl groups.

A 500 ml flask equipped with a condenser and nitrogen inlet was charged with the following reactants:
Dimethyl siloxane-methylvinyl siloxane copolymer (Petrarch; 1 Pa.s, 7.5% methylvinylsiloxy units) (100 g)
thioethanol (Merck) (21.7 g)
AIBN (0.6 g)
toluene (200 ml)

The mixture was heated to 70° C. and maintained at that temperature for six hours. The solvent and the unreacted products were then removed by evaporation under reduced pressure to yield the product (118 g).

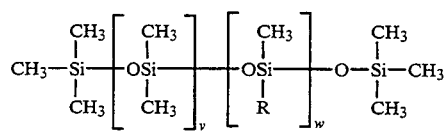

where $R = CH_2CH_2-S-CH_2CH_2OH$  $v=348$  $w=25$.

NMR analysis ($^1$H, 250 MHz, CDCl$_3$) evidenced the disappearance of the vinyl protons at 6.0 ppm and the appearance of multiplets at 0.9 and 2.6 ppm indicating protons alpha and beta to a Silicon atom and at 2.7 and 3.6 ppm indicating protons alpha and beta to an hydroxyl group.

NMR ($^{13}$C, 80 MHz, CDCl$_3$) made it possible to assign the signals in the following way:

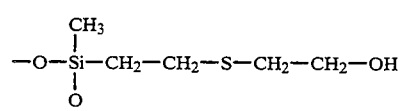

delta in ppm 1.05. 18.6, 26.2, 35.2, 60.2. The OH group content of the product was 1.2%.

Stage 2—Preparation of a Polysiloxane Containing an Oxyalkylene Styrene Group.

A 100 ml flask equipped with condenser and nitrogen inlet was charged with the following ingredients:
Product of Stage 1 (10 g)
p-chloromethylstyrene, 90 wt % (1.07 g)
hydroquinone (0.1 ml)
tetrachloromethylene (50 ml).

The reaction mixture was heated to 60° C. with stirring and maintained at this temperature for six hours, cooled and the resultant white precipitate filtered. The solvent was removed under reduced pressure and the residue taken up in diethyl ether, filtered over sodium sulphate and evaporated to dryness to yield a polysiloxane of the following structure:

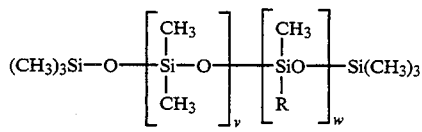

where $R = -(CH_2)_2S(CH_2)_2OCH_2- \phi -CH=CH_2$.

NMR analysis ($^1$H, 200 MHz, CDCl$_3$) provided the following assignment of the signals:

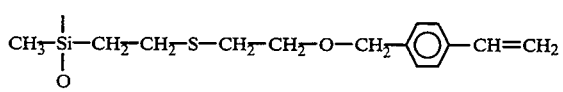

delta in ppm 0.05(s), 0.9(t), 2.6(t), 2.7(t), 3.7(t), 4.6(s), 7.4(m), 6.6(m), 5.2–5.7(AB).

The NMR ($^{13}$C, 200 MHz, CDCl$_3$) was assigned as follows:

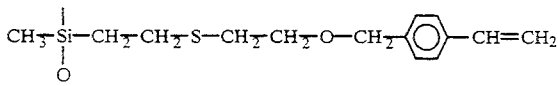

delta in ppm 0.9, 18.30, 25.9, 34.9, 60.2, 46.0, 136.2, 114.4.

EXAMPLE 2

Preparation of a Polysiloxane Containing Pendant Fluorinated Alkyl Groups and Pendant and Terminal Oxamethylene Styrene Groups.

Stage 1.

a 250 ml flask equipped with condenser and nitrogen inlet was charged with the following reactants:

α,w-dihydroxy-polydimethyl siloxane (Rhone Poulenc) having an OH content of 5%, Mn of 680, v=8.9, (50 g)
Acetoxy-3-propyl-methyldichlorosilane (Petrarch), (9.84 g, 0,044 mol)
Perfluorinated silane $C_6F_{13}C_2H_4OC_3H_6SiCH_3Cl_2$, (11.40 g, 0,022 mol)
Pyridine (2.0 ml)
Tetrachlorethylene (100 ml)

The mixture was stirred at 60° C. for 24 hours, cooled and the resultant white precipitate filtered. The mixture was evaporated under reduced pressure to remove solvent and any unreacted starting materials, the residue was then taken up in diethyl ether (50 ml) and the ethereal phase was washed with water (3×50 ml) before being dried over sodium sulphate ($Na_2SO_4$) and evaporated to dryness to yield the desired polysiloxane (95%).

Infra red analysis (Perkin Elmer 398) evidenced the disappearance of the SiOH band at 3360 cm$^{-1}$ and the appearance of the C=O band at 1760 cm$^{-1}$. The structure of the resulting product was determined as

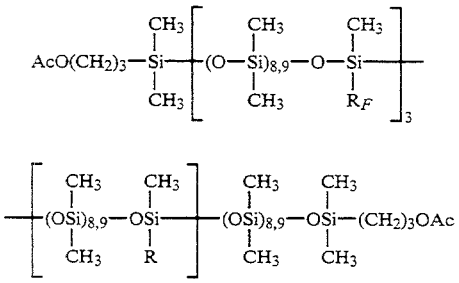

where $R_F=C_3H_6-O-C_2H_4-C_6F_{13}$, $R=C_3H_6-OCOCH_3$ and

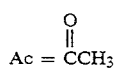

This structure correspond to the theoretical weight percentage of fluorine (theoretical 8%, found 7.96%) and the molecular weight of 9300.

Stage 2—Hydrolysis of the Acetoxy Functionality

The hydrolysis of the product obtained in the first stage was carried out by stirring for 24 hours at room temperature in methanol in the presence of KCN (1 wt.-%). The resultant mixture was concentrated under reduced pressure and the residue taken up in diethyl ether, filtered over sodium sulphate ($Na_2SO_4$) and the solvent removed under reduced pressure.

NMR ($^1$H, 200 MHz, CDCl$_3$) analysis demonstrated that the reaction had not gone to completion (only 66% of the hydrolysis product was recovered).

Stage 3—Grafting of Chloromethyl Styrene to the Hyroxy-Functional Polysiloxane

A 2-necked flask equipped with a condenser and a nitrogen inlet was charged with the following reactants:

The product obtained in the second stage (10 g)
p-chloromethylstyrene (0.918 g)
Hydroquinone (0.1 g)
Pyridine (1.0 ml)
Tetrachloroethylene (20 g)

The mixture was stirred at 60° C for 12 hours before being cooled and dissolved in diethyl ether, filtered over sodium sulphate ($Na_2SO_4$) and concentrated under reduced pressure. NMR ($^1$H, 200 MHz, CDCl$_3$) analysis of the product made the following assignments:

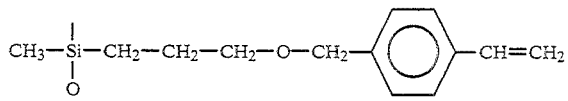

delta in ppm 0.05(s), 0.6(m), 1.6(m), 3.7(t), 4.6(s), 7.4(m), 6.6-6.8(t), 5.2-5.7(AB).

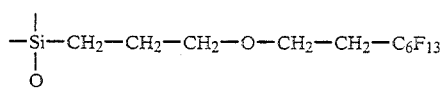

delta in ppm 0.6(m), 1.6(m), 3.6(t), 3.5(m), 2.4(m).

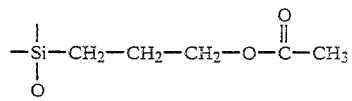

delta in ppm 0.6(m), 1.6(m), 4.0(t), 2.0(s).

EXAMPLE 3

Synthesis of a Polysiloxane Containing Perfluorinated Groups and Styrene Grafts.

Stage 1.

A 2-necked flask was equipped with condenser and nitrogen inlet was charged with the following reactants:

| | |
|---|---|
| | v = 4, 35; |
| | % OH = 10, Mn 340 |
| | (22 g, 0.0647 mol) |
| Acetoxy-3-propyl, methyl dichlorosilane | (5.56 g, 0.0258 mol) |
| $C_8F_{17}C_2H_4OC_3H_6SiCl_2CH_3$ | (12.01 g, 0.0194 mol) |
| $C_6F_{13}C_2H_4SiCl_2CH_3$ | (5.96 g, 0.0129 mol) |
| $AcOC_3H_6SiCl_2CH_3$ | (2.52 g, 0.0129 mol) |
| Pyridine | (1.0 ml) |

The reaction was carried out and the product worked-up according to the method described in Example 2. The structure of the resulting polymer was determined as:

$$R-\underset{CH_3}{\overset{CH_3}{Si}}-\left[(OSi)_{4.35}-O-\underset{CH_3}{\overset{CH_3}{Si}}\right]_4\left[(OSi)_{4.35}-O\underset{CH_3}{\overset{CH_3}{Si}}\right]_2$$

$$-\left[(OSi)_{4.35}-O-\underset{R'f}{\overset{CH_3}{Si}}\right]-(OSi)_{4.35}-O\underset{CH_3}{\overset{CH_3}{Si}}-R$$

where $R = {+CH_2\!\!+\!\!_3}OAc$, $R_f = C_6F_{13}{+CH_2\!\!+\!\!_2}$, $R'f = C_8F_{17}{+CH_2\!\!+\!\!_2}O(CH_2{+\!\!_3})$.

The elemental analysis and the molecular weight analysis were in accordance with the structure presented above (wt % fluorine; theoretical 21%, found 22.82% Mw 6700).

Stage 2—Hydrolysis of Acetoxy Functionality

The product obtained in the first stage was stirred in method in the presence of KCN (1 Wt %) at room temperature for 24 hours.

Stage 3—Grafting of Chloromethyl Styrene to the Hydroxyl Functionality

The product obtained in the second stage (7 g) was added to a mixture of chloromethyl styrene (0.079 g), hydroquinone and pyridine (1.0 ml) in tetrachloroethylene (20 ml) under a blanket of nitrogen. The reaction was carried out and worked up according to the method of Example 2 (stage 3).

EXAMPLE 4

Preparation of a Polysiloxane Containing Pendant Fluorinated Substituents and Styrene Ether Substituents and Dimethylphenyl Silyl Terminal Groups.

Stage 1.

A 2-necked flask equipped with condenser and nitrogen inlet was charged with the following reactants:

| Reactant | Amount |
|---|---|
| $HO{+SiO+\!\!_v}H$ with $CH_3$/$CH_3$ | v = 5,8; % OH = 7.5, Mn 450 (73.35 g, 0.163 mol) |
| AcOC$_3$H$_6$SiCl$_2$CH$_3$ | (2.52 g, 0.0129 mol) |
| C$_8$F$_{17}$C$_2$H$_4$OC$_3$H$_6$SiCl$_2$CH$_3$ | (1.75 g, 0.0815 mol) |
| C$_6$F$_{13}$C$_2$H$_4$SiCl$_2$CH$_3$ | (14.0 g, 0.027 mol) |
| $\phi$SiCl(CH$_3$)$_2$ | (4.63 g, 0.027 mol) |
| Pyridine | (4.0 ml) |
| Carbon tetrachloride | (100 ml) |

The reaction conditions and work-up of the product was the same as described in Example 2. The structure of the resultant product was determined as follows:

$$\phi-\underset{}{Si}-\left[(OSi)_{5.8}-(OSi)\atop {CH_3\quad R}\right]_6\left[(OSi)_{5.8}-(OSi)\atop {CH_3\quad R_f}\right]_2$$

$$-\left[(OSi)_{5.8}-(OSi)\atop {CH_3\quad R'f}\right]_3$$

$$(OSi)_{5.8}-O-\underset{CH_3}{\overset{CH_3}{Si}}-\phi$$

where $R = AcO{+CH_2+\!\!_3}$, $R_f = C_6F_{13}{+CH_2+\!\!_2}$, $R'f = C_8F_{17}{+CH_2+\!\!_2}O(CH_2+\!\!_3)$.

The elemental analysis of fluorine and molecular weight analysis were in accordance with the structure presented above (Fluorine wt % theoretical 16.2%, found 17.6%; Mw 9000)

Stage 2—Hydrolysis of the Acetoxy Functionality

The product obtained in the first stage was stirred in methanol in the presence of KCN for 24 hours at room temperature.

Stage 3—Grafting of Chloromethylstyrene

The product obtained after hydrolysis (12 g) was added to a mixture of p-chloromethyl styrene 90wt% (1.18g), hydroquinone (0.1 g) and pyridine (1.0 ml) in carbon tetrachloride (60 ml) under a blanket of nitrogen.

NMR ($^1$H, CDCl$_3$) analysis of the resulting product was consistent with the following structure:

$$\phi-Si-\left[(OSi)_{5.8}-(OSi)\atop{CH_3\quad R}\right]_6\left[(OSi)_{5.8}-(OSi)\atop{CH_3\quad R_f}\right]_2$$

$$-\left[(OSi)_{5.8}-(OSi)\atop{CH_3\quad R'f}\right]-OSi-\phi$$

where $R = (CH_2)_3-O-CH_2-\underset{}{\bigcirc}-CH=CH_2$, $Rf = C_6F_{13}{+CH_2+\!\!_2}O{+CH_2+\!\!_3}$, $R'f = C_8F_{17}{+CH_2+\!\!_2}O(CH_2+\!\!_3)$.

EXAMPLE 5

Stage 1—Copolycondensation.

A 3-necked flask was equipped with condenser and nitrogen inlet was charged with the following reactants:

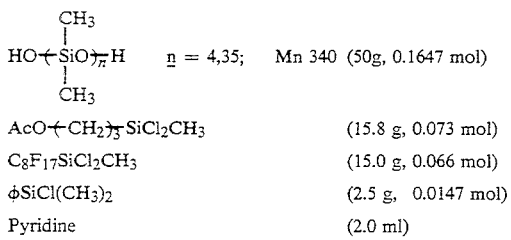

| | |
|---|---|
| AcO←CH₂→₃SiCl₂CH₃ | (15.8 g, 0.073 mol) |
| C₈F₁₇SiCl₂CH₃ | (15.0 g, 0.066 mol) |
| φSiCl(CH₃)₂ | (2.5 g, 0.0147 mol) |
| Pyridine | (2.0 ml) |

The mixture was stirred at 70° C. for 24 hours before being cooled, diluted with diethyl ether and washed with water (3×30 ml). The ethereal solution was dried over Na₂SO₄ plus NaHCO₃ in order to eliminate traces of acidity and the solvent removed under reduced pressure.

The structure of the resulting product was determined as:

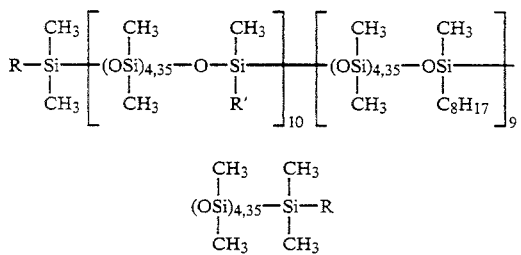

This structure has a molecular weight of 10,000.

Stage 2—Hydrolysis of the Product Obtained in Stage 1.

The product obtained in the first stage is hydrolysed in the presence of KCN (1 wt. %) in methanol at room temperature for 24 hours. The reaction was successful in hydrolysing 96% of the acetoxy groups.

Stage 3—Grafting of Chloromethyl Styrene

The product obtained in the second stage (10.0 g) was added to a mixture of chloromethylstyrene (1.52 g), pyridine (0.2 g) and hydroquinone (0.04 g) in carbon tetrachloride (30 g). The resultant mixture was stirred at 60° C. for 18 hours before being cooled and the solvent removed under reduced pressure. The residue dissolved in diethyl ether and filtered through Na₂SO₄ and NaHCO₃, the ethereal solution was then evaporated to dryness. The structure of the product is shown below.

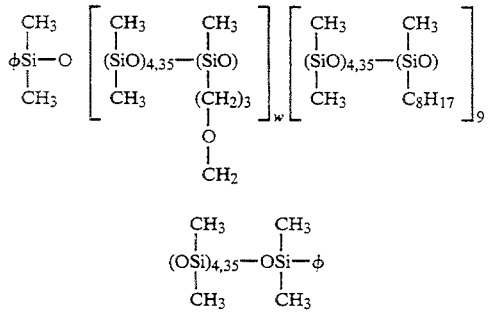

EXAMPLE 6

Stage 1—Copolycondensation

A 3-necked flask equipped with condenser, an ampoule of bromine and a nitrogen inlet was charged with the following reactants:

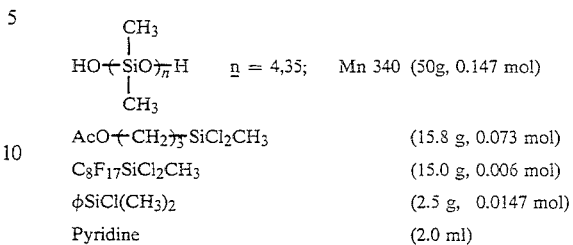

| | |
|---|---|
| AcO←CH₂→₃SiCl₂CH₃ | (15.8 g, 0.073 mol) |
| C₈F₁₇SiCl₂CH₃ | (15.0 g, 0.006 mol) |
| φSiCl(CH₃)₂ | (2.5 g, 0.0147 mol) |
| Pyridine | (2.0 ml) |

The mixture was stirred at 70° C. for 24 hours, before being cooled, diluted with diethyl ether and washed with water (3×50 ml). The ethereal solution was dried over Na₂SO₄ and NaHCO₃ in order to remove traces of acidity.

The structure of the resulting product was the following:

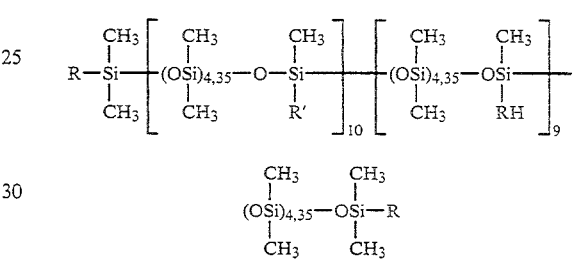

This structure has a molecular weight of 10,500

Stage 2—Hydrolysis of the Aetoxy Fnctionality.

The product obtained in the first stage was reacted in the presence of KCN (1 wt.-%) in methanol at room temperature for 24 hours to yield the hydrolysed product in 96% yield.

Stage 3—Grafting of Chloromethyl Styrene.

The product obtained in the second stage (10 g) was added to a mixture of chloromethyl styrene (1.49 g), pyridine (0.2 g), and hydroquinone (0.04 g) in tetrachloromethylene (30 g) under nitrogen. The resultant mixture was stirred at 60° C. for 18 hours. The mixture was cooled, diluted with diethyl and filtered over Na₂SO₄ and NaHCO₃ and concentrated to remove the solvent. The structure of the resulting product is:

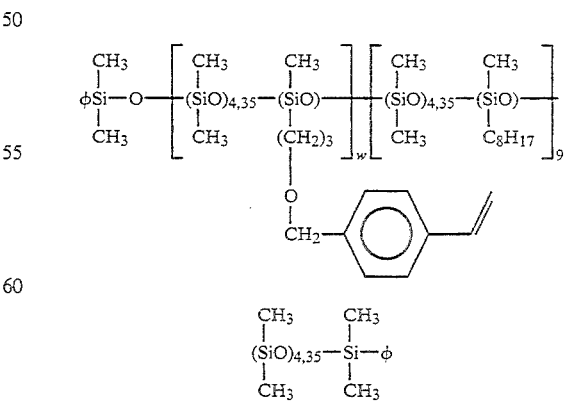

EXAMPLE 7

Stage 1.

A 3-necked flask equipped with a condenser, an ampoule with bromine and a nitrogen inlet was charged with the following reactants:

| | | |
|---|---|---|
| OH—SiO)$_n$H | n = 8, 9; Mn 680 | (50 g, 0.735 mol) |
| AcO—CH$_2$)$_3$SiCl$_2$CH$_3$ | | (9.48 g, 0.0441 mol) |
| SiCl$_2$(CH$_3$)$_2$ | | (2.83 g, 0.022 mol) |
| C$_8$F$_{17}$SiCl$_2$CH$_3$ | | (2.86 g, 0.0147 mol) |
| Pyridine | | (2.0 ml) |
| Carbon tetrachloride | | (60 ml) |

The mixture was reacted and worked-up according to the procedure described in example 6. The structure of the product is as follows:

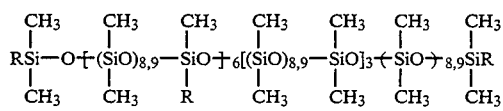

where

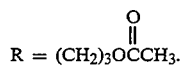

$R = (CH_2)_3OCCH_3$ (with O double-bonded to C).

The polymer of this structure has a molecular weight of approximately 8000.

Stage 2—Hydrolysis of the Acetoxy Functionality.

The product obtained in the first stage was reacted in the presence of KCN (1 wt.%) in methanol at room temperature for 24 hours to yield the hydrolysed product in yield.

Stage 3—Grafting of Chloromethyl Styrene.

The product obtained in the second stage (10 g) was added to a mixture of chloromethyl styrene (1.21 g), pyridine (0.5 g) and hydroquinone (0.1 g) in chloroform (30 g) under nitrogen. Upon completion of the reaction the mixture was concentrated under reduced pressure to remove the solvent, the residue was diluted with diethyl ether and the ethereal solution filtered over Na$_2$SO$_4$ and NaHCO$_3$ before being evaporated to dryness. The structure of the resulting product was:

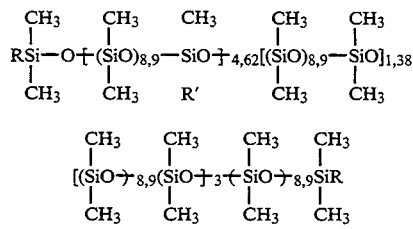

where R=CH$_3$CO—(CH$_2$)$_3$— and R'=(CH$_2$)$_3$—OCH$_2$PhCH=CH$_2$.

EXAMPLE 8

Use of Polymers of the Invention in Coating Compositions.

Coating compositions were prepared by dissolving a co-polymer of the invention and a photosensitive catalyst in a solvent in the proportions indicated in the following table and applying these compositions to sheets of aluminium with the help of a manual applicator made of a threaded rod, in the quantities (g/m$^2$) indicated in the table. The applied layer was crosslinked by exposure to a UV lamp (80/C W/cm$^2$) for the time indicated in the table. In all cases a sheet was obtained with antiadherent properties from which strips of adhesive could be easily peeled off. Moreover, no trace of migration was found from the anti-adhesive film of the silicone polymer of the invention on the strip of adhesive as evidenced by the fact that the latter remained capable of adhering to itself.

| Composition | Polymer Type | Polymer Quantity | Solvent Type | Solvent Quantity |
|---|---|---|---|---|
| A | Example 1 | 0.75 g | Acetone | 0.04 g |
| B | Example 2 | 0.5 g | Acetone | 0.03 g |
| C | Example 3 | 0.78 g | Acetone | 0.03 g |
| D | Example 4 | 1 g | Acetone | 0.05 g |
| E | Example 5 | 1 g | Acetone | 0.03 g |
| F | Example 6 | 1 g | Acetone | 0.03 g |
| G | Example 7 | 1 g | Acetone | 0.03 g |

| Composition | Catalyst Type | Catalyst Quantity | Exposure Time to UV |
|---|---|---|---|
| A | φ$_3$S + SBf$_6$— | 0.03 g | 10 seconds |
| B | φ$_3$S + SBf$_6$— | 0.03 g | 20 seconds |
| C | φ$_3$S + SBf$_6$— | 0.04 g | 20 seconds |
| D | φ$_3$S + SBf$_6$— | 0.04 g | 20 seconds |
| E | φ$_3$S + SBf$_6$— | 0.03 g | 10 seconds |
| F | φ$_3$S + SBf$_6$— | 0.03 g | 10 seconds |
| G | φ$_3$S + SBf$_6$— | 0.03 g | 10 seconds |

Dynamometric measurements of the detachment force necessary for separating kraft paper coated with a layer of the co-polymer of Example 3 and a strip of adhesive based on butadiene-styrene rubber sold under the trade mark TESA gave the values of approximately 50 g/2.54 cm at 25° C. after one day of aging at room temperature and approximately 65 g/2.54 cm after one day of aging at 50° C. Similar measurements performed with a strip of adhesive based on acrylate sold under the trademark TESA 7675 gave separation force values of about t 100 g/2.54 cm after one day of aging at 25° C. and approximately 120 g/2.56 cm after one day of aging at 50° C.

That which is claimed is:

1. A silicone co-polymer of molecular weight 5,000 to 100,000 having the general formula (I)

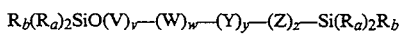

$R_b(R_a)_2SiO(V)_v$—$(W)_w$—$(Y)_y$—$(Z)_z$—$Si(R_a)_2R_b$ wherein V is a diorganosiloxane unit having monovalent hydrocarbon substituents having 1 to 8 carbon atoms, R$_a$ is selected from the group consisting of methyl, ethyl, n-propyl, n-butyl, pentyl, hexyl, octyl and phenyl provided no more than one phenyl radical is bonded to any silicon atom, R$_b$ is selected from the group consisting of R$_a$ and an oxyalkylene styrene group connected to a silicon atom of a siloxane unit through a group selected from an alkylene unit, an alkylene unit having at least one oxygen atom in the chain and an alkylene unit having at least one sulphur atom in the chain, W is a siloxane unit having an oxyalkylene styrene group connected to the silicon atom of the siloxane unit through a group selected from an alkylene unit, an alkylene unit having at least one oxygen atom in the chain and an alkylene unit having at least one sulphur atom in the chain, Y is a diorganosiloxy unit wherein the organo radicals are selected from the group consisting of hydrocarbon having 1 to 12 carbon atoms and fluorinated hydrocarbon groups having 1 to 12 carbon atoms, Z represents a silfluoroalkylene-siloxy unit, v, y and z have identical or different values but they are not simultaneously zero; w is always non-zero and $v+y+z/w$ is from 1 to 100.

2. A silicone copolymer according to claim 1 wherein the unit (V) is according to the formula $-Si(R_a)_2O-$.

3. A silicone copolymer according to claim 1 wherein the unit (W) is according to the formula $SiR'_a(R_c-R_d-PhCH=CH_2)O-$ wherein $R'_a$ is a group selected from the group consisting of $R_a$ and alkoxy having 1 to 4 carbon atoms, $R_c$ is selected from the group consisting of an alkylene unit, an alkylene unit having at least one oxygen atom in the chain and an alkylene unit having at least one sulphur atom in the chain, $R_d$ is an oxyalkylene unit and Ph is selected from the group consisting of para- and meta- substituted phenylene.

4. A silicone copolymer according to claim 3 wherein $R_c$ is selected from the group consisting of $C_2H_4$, $C_3H_6$, $C_2H_4SC_2H_4$, $C_3H_6SC_2H_4$, $C_3H_6OC_2H_4$ and $C_2H_4OC_2H_4$.

5. A silicone copolymer according to claim 3 wherein $R_d$ is selected from the group consisting of $O(CH_2)$ and $O(CH_2)_2$.

6. A silicone copolymer according to claim 1 wherein the unit (Y) is according to the formula $-SiR_aR_eO-$ wherein $R_e$ is selected from the group consisting of $C_kH_{2k}R_f$ and $C_kH_{2k}R_a$ where k is 2, 3 or 4 and Rf is selected from the group consisting of fluorinated alkyl groups with 1 to 12 carbon atoms, higher perfluoroalkyl groups formed from the telomerization of tetrafluoroethylene (TFE) and higher perfluoroalkyl groups formed from the telomerization of a monovalent radical selected from an oligomer of fluorinated oxetanes and of fluorinated oxiranes.

7. A copolymer according to claim 6, wherein $R_f$ is selected from the group consisting of $-CF_3$, $-C_2F_5$, $-C_3F_7$, $-C_4F_9$, $-C_6F_{13}$, and $-C_8F_{17}$.

8. A silicone copolymer according to claim 1 wherein the unit (Z) is according to the formula $-R_aR_e-SiC_nH_{2n}R'_fC_nH_{2n}SiR_aR_eO-$ wherein $R'_f$ is selected from the group consisting of perfluoroalkylene groups with 2 to 10 carbon atoms, an alpha, omega-fluoroalkenyl group formed by telomerization of tetrafluoroethylene and an alpha, omega-fluoroalkylene formed by the telomerization of a divalent telechelic radical of an oligomer selected from the group consisting of fluorinated oxetanes, fluorinated oxiranes and a m-phenylene di-(hexafluoroisopropoxy) radical and n is 2, 3 or 4.

9. A copolymer according to claim 8, wherein $R'_f$ is selected from the group consisting of $-C_2F_4$, $-C_4F_8$, $-C_6F_{12}$, and $-C_8F_{16}$.

10. A copolymer according to claim 1, wherein the silicone copolymer is represented by the formula:

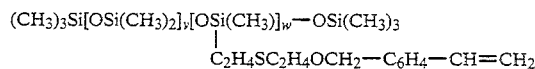

wherein v and w are as defined hereinabove.

* * * * *